United States Patent [19]

Vadasdi et al.

[11] 4,405,571

[45] Sep. 20, 1983

[54] PROCESS FOR SELECTIVE DISSOLUTION OF MOLYBDENUM IN THE PRESENCE OF TUNGSTEN

[75] Inventors: Károly Vadasdi, Korong; László Bartha, Toldy; Tivadar Millner, Mikszath; Endre Tekula, Dessexffy; András Kiss, Hlma, all of Hungary

[73] Assignee: MTA Müszaki Fizikai Kutato Intezete, Budapest, Hungary

[21] Appl. No.: 337,685

[22] Filed: Jan. 7, 1982

[30] Foreign Application Priority Data

Jun. 22, 1979 [HU] Hungary .............................. MA 3152

[51] Int. Cl.$^3$ ....................... C01G 39/00; C01G 41/00
[52] U.S. Cl. ..................................... 423/53; 75/101 R
[58] Field of Search ........................ 423/53; 75/101 R

[56] References Cited

U.S. PATENT DOCUMENTS 3,969,478  7/1976  Zelikman et al. ..................... 423/54
4,298,582  11/1981  Menashi et al. ....................... 423/53

Primary Examiner—Herbert T. Carter
Attorney, Agent, or Firm—Keil & Witherspoon

[57] ABSTRACT

A process for the selective dissolution of molybdenum in the presence of tungsten in which the molybdenum is dissolved in an aqueous solution, having a pH of from −0.5 to +2.0, of a peroxy compound selected from the group consisting of hydrogen peroxide and ammonium peroxysulfate and in the presence of a catalyst selected from a salt of the group consisting of iron, nickel, copper, silver and thallium.

7 Claims, No Drawings

PROCESS FOR SELECTIVE DISSOLUTION OF MOLYBDENUM IN THE PRESENCE OF TUNGSTEN

This invention relates to a process of selective dissolution of molybdenum in the presence of tungsten, and especially of dissolution of the molybdenum mandrel of tungsten coils.

Tungsten coils of incandescent lamps are manufactured by coiling or coil-coiling the tungsten filament onto a mandrel, which is a molybdenum wire in most cases. The coils are annealed around a temperature of 1500° C. for recovering the mechanically deformed tungsten wire. The recovered coils keep their shape after having the molybdenum mandrel dissolved.

As a result of the coiling process the tungsten wire gets pressed onto the molybdenum mandrel, therefore the two metals contact not only along a line but along a wider surface area. During the recovery annealing a certain amount of each metal diffuses into the other one across the contacting area.

For dissolving the molybdenum mandrel, as a usual method, a mixture of concentrated nitric acid, sulphuric acid, and of water is applied, e.g. at a 5:3:2 volume ratio respectively/see e.g. J.A.M. van Liempt: Recueil des Travaux Chimiques des Pays-Bas, T.45.No 7/8, 508-521. 1926/, because such a solution dissolves the molybdenum without attacking the tungsten at the temperature regulated by the reaction heat.

The weight loss of the different types of tungsten coils is about 4 w % as an average during the dissolving process using the above solution. The weight loss itself and also its uncertain value has several reasons like: local changes in the solvent composition and in its temperature; local changes in the composition of the Mo-W alloy layers formed during the annealing as the alloys have different chemical resistance against the solvent.

A serious disadvantage of this method is, that during the solution process a considerable amount of nitrogen oxides develops from the nitric acid and their mixture. The so called nitrous gas is an extremely etching, corrosive material, very dangerous for the environment. It is difficult or almost impossible, but certainly quite expensive to eliminate its above mentioned effects.

The method has also another disadvantage, namely in the course of the recovery of the valuable $MoO_3$ content of the solvent one gets such byproducts which cannot mixed to the regular sewer system.

The present invention is a method for dissolution of molybdenum or especially of molybdenum mandrels in the presence of tungsten by using compounds which contain oxygen in peroxide bond. Advantageously acidic solutions are applied in the presence of some selective catalyst, advantageously ferric chloride.

In the presence of such a catalyst hydrogenperoxide soluble peroxyacids or their salts and also superoxides or their mixtures were successfully applied.

It has been known for a long time that aqueous $H_2O_2$ solutions of medium concentration dissolve slowly both the tungsten and also the molybdenum. It wasn't observed yet such a difference in the dissolving rate which would have given a possibility for the selective dissolution of the molybdenum.

The present invention contains the new idea, that there exist such catalysts-e.g. salts with $Fe^{3+}$ ions—which have no influence on the dissolution rate of tungsten in $H_2O_2$, but increase that of molybdenum with several orders of magnitude without the presence of any other solvents. Such a difference enables the dissolution of the molybdenum mandrel within a technically usable time causing only about 1-2% weight loss of the tungsten coil.

It was found useful in some cases to fit the peroxide concentration of the solvent to the specific surface area of the molybdenum i.e. to the thickness of the wire and to control the dissolution rate by adding the solvent dropwise into the reaction vessel with a needed sequence.

It was found also very advantageous for reaching an optimum reaction rate if the pH value of the solvent was kept in the range of $-0.5 \ldots +2.0$ by using organic or inorganic acids like $H_2SO_4$, $HNO_3$, HCl, $HClO_4$, acetic acid, tartaric acid or their different mixtures $H_2SO_4$ was found the most suitable.

It was technically advantageous the application of such selective catalyst e.g. ferric compounds, like $FeCl_3$ which decompose the peroxide bond. With the concentration of the catalyst the solution rate of molybdenum can be controlled within wide limits. It was found that compounds of the following elements: Fe, Cu, Tl, Ag, Pb, Cr, Ni, Bi, Te, Ce, Ti, V, Mn, Cd, or mixtures of such compounds can be used successfully for controlling the reaction.

The advances of the method described in this invention can be increased by applying such materials e.g. perchloric acid or its salts, chromic acid or its salts, which inhibit the corrosion of the tungsten in the solvent.

The dissolution rate of the molybdenum depends very much on the temperature of the solvent. We have found the range of 25°-35° C. as an optimum for minimising the dissolution of the tungsten. Therefore we advise to control the temperature by cooling.

It is advantageous to realize the dissolution in a closed vessel under pressure in order to decrease the oxygen loss caused by spontaneous decomposition of the peroxide bond.

It is an important advantage of the present invention that to the contrary of the $HNO_3$—$H_2SO_4$—$H_2O$ solvent no such byproducts will develop which would cause any danger in the environment.

A special advantage of the method is that applying $FeCl_3$ catalyst and $H_2SO_4$ for controlling the pH value of the solvent the dissolved molybdenum can be recovered in form of $MoO_3$ and the rest of the solution is fully harmless for the environment.

In the following we give some examples for the practical application of the present invention.

1. 1000 pieces of W coils, containing such Mo mandrel the weight of which is four times than that of the W, e.g. the W coil is 10 mg, the Mo mandrel is 40 mg, are put into a solution of the following composition: 500 $cm^3$ $H_2O_2$ of 30% concentration, containing 1% HCl and 0,1% $FeCl_3.6H_2O$. A vehement reaction starts already at room temperature which can be controlled by keeping the temperature under 45° C. with water-cooling. The dissolution of the mandrel needs about 15-25 min and beside of the clean W coils a solution remains, which contains the brownish peroximolybdenic acid dissolved. Separating the coils they should be washed with a diluted acidic solution, with clean water, finally with ammonium hydroxide solution and then dried. The surface of the coils is of polished character, their weight loss is 6% as a maximum, and their weight scattering corresponds to the original one.

2. An amount and type of coils as described in example 1 is put into 300 cm$^3$ solution which contains 1% Fe$_2$/SO$_4$/$_3$ and 2% perchloric acid. During water cooling 500 cm$^3$ H$_2$O$_2$ of 30% concentration is given to it drop by drop in such a rate that the temperature of the solution shouldn't be higher than 35° C. At the end of the process the coils are handled as described in example 1. The coils have polished surface character and the maximum weight loss is 2%. Weight scattering corresponds to the original one.

3. Amounts and types of coils as described in example 1 are put into 300 cm$^3$ of solutions containing 1% Fe$^{3+}$ ion and 3% acid according to the followings:
a. FeCl$_3$—HCl
b. Fe$_2$/SO$_4$/$_3$—H$_2$SO$_4$
c. Fe/NO$_3$/$_3$—HNO$_3$
d. Fe/ClO$_4$/$_3$—HClO$_4$
e. FeCl$_3$—tartaric acid H$_2$O$_2$ solution of 30% concentration is given drop by drop to each sample in such a rate that the temperature should'nt risze over 35° C. At the end of the process the coils are handled as described in example 1. The next table summarizes the parameters of the process:

|   | Time of dissolution | Consumed amount of H$_2$O$_2$ cm$^3$ | Weight loss of coils % |
|---|---|---|---|
| a | 15 | 500 | 5,4 |
| b | 25 | 600 | 5,0 |
| c | 31 | 900 | 2,6 |
| d | 40 | 1000 | 1,6 |
| e | 20 | 600 | 3,0 |

4. Coils according to example 1 are put into an autoclave of a volume of 2000 cm$^3$. The vessel has a manometer and a valve for pressure control. 300 cm$^3$ H$_2$O$_2$ of 30% concentration containing 0,2% FeCl$_3$.6H$_2$O and 0,5% H$_2$SO$_4$ is cooled down to 10° C. and poured into the vessel. The vessel is closed and the reaction gets started by slow, cautions heating up to 30° C., controlled by cooling and with the valve keeping the temperature at 30° C. and the pressure at 10 Atm. Dissolution time is about 20 min. After that the valve is opened and the coils handled as described in example 1. The weight loss of the coils is 1,4%.

5. 1000 coil, which has a Mo mandrel weight less than the weight of the W/e.g. coils for vacuum lamps with coil weight of 7 mg and mandrel weight of 3 mg/are put into 200 cm$^3$ solution with a composition of 0,5% Fe$_2$/SO$_4$/$_3$ and 1% H$_2$SO$_4$.300 cm$^3$ of a 60% ammonium-peroxisulphate solution is given to it drop by drop with a rate keeping the temperature under 40° C. The process takes about 20 min. The coils are handled as described in example 1. Their weight loss is 0,8%.

6. Coils as described in example 1 are put into 500 ml solution of the following composition:
0,1% Tl$_2$/SO$_4$/$_3$
0,02% CuSO$_4$
3% H$_2$SO$_4$ H$_2$O$_2$ solution of 30% concentration is given drop by drop into the cooled reaction vessel by such a rate that the solution temperature shouldn't go beyond 35° C. At the end of the process/about 30 min/the coils are separated and handled as described in example 1. Their weight loss is 3%.

What we claim is:

1. A process for the selective dissolution of molybdenum in the presence of tungsten which comprises: dissolving the molybdenum in an aqueous solution, having a pH of from −0.5 to +2.0, of a peroxy compound selected from the group consisting of hydrogen peroxide and ammonium peroxysulfate and in the presence of a catalyst selected from a salt of the group consisting of iron, nickel, copper, silver and thallium.

2. A process according to claim 1, where the temperature of the solution is under 45° C.

3. A process according to claim 1, where the dissolution of molybdenum is carried out in a closed vessel under pressure.

4. The process of claim 1, wherein the catalyst is a ferric salt.

5. The process of claim 4, wherein the ferric salt is selected from the group consisting of ferric chloride, ferric sulfate, ferric nitrate and ferric perchlorate.

6. The process of claim 1, wherein molybdenum mandrel of tungsten coils for incandescent lamps is dissolved in the solution.

7. The process of claim 5, wherein molybdenum mandrel of tungsten coils for incandescent lamps is dissolved in the solution.

* * * * *